US 008254301B2

(12) United States Patent
Chen et al.

(10) Patent No.: US 8,254,301 B2
(45) Date of Patent: Aug. 28, 2012

(54) GROUP-HEADER BASED METHOD TO ORGANIZE LOCAL PEER GROUP OF VEHICLES FOR INTER-VEHICLE COMMUNICATION

(75) Inventors: Wai Chen, Parsipanny, NJ (US); Jasmine Chennikara-Varghese, Somerset, NJ (US); Marcus Pang, Manalapan, NJ (US); Shengwei Cai, Florham Park, NJ (US); Toshiro Hikita, Fort Lee, NJ (US)

(73) Assignees: Telcordia Technologies, Inc., Piscataway, NJ (US); Toyota Infotechnology Center, U.S.A, Inc., Palo Alto, CA (US)

( * ) Notice: Subject to any disclaimer, the term of this patent is extended or adjusted under 35 U.S.C. 154(b) by 567 days.

(21) Appl. No.: 11/285,593

(22) Filed: Nov. 22, 2005

(65) Prior Publication Data

US 2007/0115868 A1    May 24, 2007

(51) Int. Cl.
*H04B 7/14* (2006.01)
*H04J 1/10* (2006.01)
*H04J 3/08* (2006.01)

(52) U.S. Cl. ........ 370/315; 370/328; 370/338; 370/342; 455/522

(58) Field of Classification Search .................. 370/338, 370/342, 328, 315; 455/522
See application file for complete search history.

(56) References Cited

U.S. PATENT DOCUMENTS

| 6,628,620 | B1 * | 9/2003 | Cain | 370/248 |
| 7,120,681 | B2 * | 10/2006 | Frelechoux et al. | 709/221 |
| 2001/0043585 | A1 * | 11/2001 | Hummel | 370/351 |
| 2002/0018448 | A1 * | 2/2002 | Amis et al. | 370/255 |
| 2004/0190476 | A1 * | 9/2004 | Bansal et al. | 370/338 |
| 2005/0036470 | A1 * | 2/2005 | Calvert | 370/338 |
| 2005/0059420 | A1 * | 3/2005 | Salokannel et al. | 455/522 |
| 2005/0075084 | A1 * | 4/2005 | Salokannel et al. | 455/126 |
| 2005/0078646 | A1 * | 4/2005 | Hong et al. | 370/338 |
| 2005/0078672 | A1 * | 4/2005 | Caliskan et al. | 370/389 |
| 2006/0045055 | A1 * | 3/2006 | Ramadas et al. | 370/338 |
| 2007/0002809 | A1 * | 1/2007 | Reunamaki et al. | 370/338 |

OTHER PUBLICATIONS

A. B. McDonald and T.F. Znati, "A Mobility Based Framework for Adaptive Clustering in Wireless Ad-Hoc Networks", *IEEE Journal on Selected Areas in Communications*, vol. 17, No. 8, Aug. 1999, pp. 1466-1487.

W. Chen and S. Cai, "Ad Hoc Peer-To-Peer Network Architecture for Vehicle Safety Communications", *IEEE Communications Magazine*, vol. 43, No. 4, Apr. 2005, pp. 100-107.

(Continued)

*Primary Examiner* — Rafael Pérez Gutiérrez
*Assistant Examiner* — Liton Miah
(74) *Attorney, Agent, or Firm* — Philip J. Feig

(57) ABSTRACT

A method for establishing and maintaining the network and a corresponding ad-hoc moving-device to moving-device network having a plurality of moving-devices grouped into a Local Peer Group (LPG) is disclosed. A group header node (GH) is selected from the plurality of moving wireless devices in the LPG. The GH controls and manages the LPG by broadcasting a plurality of control messages, including a heartbeat message at a fixed interval. The LPG also includes at least one group node (GN). The at least one GN can communicate with the GH via a network link created between the at least one GN and the GH. The GNs join the LPG via the GH. If there is more then one GH in an LPG, header resolution occurs to select only one GH.

20 Claims, 9 Drawing Sheets

OTHER PUBLICATIONS

C. R. Lin and M. Gerla, "Adaptive Clustering for Mobile Wireless Networks", *IEEE Journal on Selected Areas in Communication*, vol. 15, Sep. 1997, pp. 1265-1275.

FleetNet—Internet on the Road, "Ad Hoc Radio Network for Inter-Vehicle Communications",DaimlerChrysler AG, Fleetnet: www.fleetnet.de, Jan. 2002.

J. Tian et al, "Routing Protocol Implementation", CarTalk, Information Society Technologies, Oct. 30, 2003, pp. 1-41.

P.L.J. Morsink et al, "Preliminary Design of an Application for Communication Based Longitudinal Control in the CarTalk2000 Project", CarTalk, Information Society Technologies, pp. 1-13, Oct. 30, 2003.

C. Cseh, DCA et al,"Communication Architecture" 2002 CarTalk 2000 Consortium, Oct. 28, 2002, pp. 1-145.

H. Wu et al "SYN-MAC: A Distributed Medium Access Control Protocol for Synchronized Wireless Networks", *Proceedings of IEEE International Conference on Network Protocols (ICNP) 2003*, Atlanta, GA, pp. 1-23.

J. Li et al, "Capacity Evaluation of Multi-Channel Multi-Hop Ad Hoc Networks", *IEEE International Conference on Personal Wireless Communications*, ICPWC 2002, pp. 1-4.

H. Fnβler et al, "Contention-Based Forwarding for Mobile Ad-Hoc Networks", Ad Hoc Wireless Networks Journal, Elsevier, Nov. 2003, pp. 351-369.

ASTM E2213-03 Standard Specification for Telecommunications and Information Exchange Between Roadside and Vehicle Systems—5 GHz Band Dedicated Short Range Communications(DSRC) Medium Access Control (MAC) and Physical Layer (PHY) Specifications, Book of Standards 04.03, ASTM International.

F. Borgonovo, "MAC for Ad-Hoc Inter-Vehicle Network: Services and Performance", *Proceedings of the 58th IEEE Semiannual Vehicular Technology Conference*, Oct. 6-9, 2003, pp. 2789-2793.

J. Yin, "Performance Evaluation of Safety Applications Over DSRC Vehicular Ad Hoc Networks", First ACM Workshop on Vehicular Ad Hoc Networks (VANET 2004), Oct. 1, 2004, Philadelphia, PA, pp. 1-9.

C. Maihöfer et al, "Performance Evaluation of Stored Geocast", *The 58th IEEE Semiannual Vehicular Technology Conference (VTC)*, Orlando, FL, Oct. 2003, pp. 1-6.

R. Schollmeier et al, "Routing in Mobile Ad Hoc and Peer-To-Peer Networks. A Comparison", Second International Conference on Peer-To-Peer Computing (P2P'02), 2002, pp. 1-15.

Y. Kwon et al, "A Novel MAC Protocol with Fast Collision Resolution for Wireless LANs", *IEEE INFOCOM 2003*, Mar. 30-Apr. 3, 2003, San Francisco, CA, pp. 1-10.

J. Aceves et al, "The Core-Assisted Mesh Protocol", *IEEE Journal on Selected Areas in Communications, Special Issue on Ad-Hoc Networks*, vol. 17, No. 8, Aug. 1999, pp. 1380-1394.

I. Chisalita and N. Shahmehri, "A Peer-To-Peer Approach to Vehicular Communication for the Support of Traffic Safety Applications," *5th IEEE Conference on Intelligent Transportation Systems*, Sep. 2002.

H. Reumerman et al, "The Application-Based Clustering Concept and Requirements for Intervehicle Networks", *IEEE Communications Magazine*, Apr. 2005, pp. 108-113.

International Search Report, dated Sep. 12, 2007.

Toner, S. and O'Mahony, D., Self-Organising Node Address Management in Ad-hoc Networks in: Personal Wireless Communications, IFIP-TC6 8th International Conference, PWC 2003.

* cited by examiner

GROUP-HEADER BASED METHOD TO ORGANIZE LOCAL PEER GROUP OF VEHICLES FOR INTER-VEHICLE COMMUNICATION

CROSS-REFERENCE TO RELATED APPLICATIONS

This application is related to co-pending, concurrently filed and commonly owned application entitled "Linked Equivalent Cell Header-Based Approach and Protocol for Organizing an Ad-Hoc network".

BACKGROUND OF THE INVENTION

1. Field of Invention

This invention relates to an ad-hoc wireless network for a communication in a mobile environment. More specifically, the invention relates to establishment and maintenance of a moving-device to moving-device ad-hoc wireless network to achieve near-instantaneous communications.

2. Description of Related Art

Wireless technology has become common in all aspects of life today, whether it be a wireless home or office network, so-called "hotspot" networks at local cafes, fast food chains or hotels, or even citywide implementations of WiFi technologies. The aim of this wireless push in society is to provide accessibility to information and to increase the productivity that society as a whole has enjoyed through the wide acceptance and utilization of computer networks and especially the Internet. Wireless networking technology, such as 802.11a/b/g, allows WiFi-enabled devices to connect to each other as they would in a standard wired network without the restriction of wires. People are given the freedom to remain connected to a network regardless of their physical location within the network coverage area.

With this goal in mind, several cities have attempted to create a wireless network for the city. For example, on Jul. 29, 2004, Grand Haven, Mich. claimed the distinction of being the "first WiFi city in America" with its implementation of a citywide wireless network covering the 6 square miles of the city and extending 15 miles into Lake Michigan. Many city officials see WiFi as an infrastructure necessity, much like sewage, power, telephone and transportation, for attracting and retaining business. The benefits of such systems for the city administrators are many, ranging from providing communication among city employees to providing public service announcements, advisories and other useful information to the citizenry at large.

In this drive for greater wireless connectivity, one area of everyday life has lagged behind. The roads and highways of America have remained largely untouched by wireless technology beyond rudimentary satellite and cellular phone systems. However, there are many advantages to be gained from wireless network technology implementations on American roads. Among the most notable are traffic advisories, Amber alerts, weather advisories, etc., which could be relayed to all vehicles that may be affected on an immediate basis.

Further, networking automobiles together allows the relay of information about a vehicle that may affect other vehicles in the vicinity. For example, an automobile may suddenly brake; this action could be reported to all vehicles behind the braking automobile instantaneously, thus allowing the drivers of the other vehicles to take necessary action with less urgency. This aspect has clear implications for reducing traffic accidents and congestion. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from a stationary infrastructure. Vehicles communicate with each other when they are within the same radio range of each other or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 mili-second) and sustained throughput (or equivalently, the percentage of neighboring vehicles that successfully receive warning messages) in order to support various VSC applications such as collision avoidance.

Simply installing wireless antenna on a moving vehicle and then transmitting uncoordinated communications would not suffice for satisfying these requirements. Specifically, by transmitting uncoordinated data, the airwaves would be flooded with a plurality of messages, which would result in a jamming of the radio waves, as the radio bandwidth is limited.

As such, these vehicles would interfere with each other's transmission and compete with each other for radio bandwidth for transmission. Further, all messages would propagate in all directions without any consideration of a desired transmission direction.

Additionally, each vehicle would not match other vehicles' network configurations.

The high mobility and lack of inherent relationships make a priori configuration of vehicles into vehicle groups problematic (e.g., no vehicle knows anything about its neighbors beforehand). All information that is necessary for setting up safety communications must be exchanged in near real-time among vehicles, and vehicles in the groups must configure themselves in near real-time so that safety communication can take place. The high mobility of uncoordinated vehicles implies frequent change of neighbors or vehicle groups, and poses difficulties of using support-servers (for mobility, address, name, media session) within vehicle groups. These key differences make existing tactical ad-hoc networking technologies not directly applicable to vehicle groups for safety communications.

Using WiFi methods employed elsewhere, such as hotspots, are impractical because of coverage, data traffic volume and latency issues. A normal rush hour commute around a major city could yield a vehicle density of as much as 600 vehicles per 1200-meter length of a 3-lane highway. In addition, all these vehicles are moving through individual coverage areas at a rate of 30 to 60 mph. Most wireless systems are not equipped to handle such a large rate of change in their network.

Specifically, as a vehicle enters the coverage area, it would need to be identified and issued configuration instructions by a wireless access point or router. When a vehicle leaves the coverage area, the wireless access point or router would need to update its records to remove the vehicle form its network. Thus, the speed of a vehicle through a particular coverage area determines how often updating information, e.g. handshaking, needs to be broadcasted by the wireless access point or router and responded to by all the vehicles in range. All these vehicles transmitting information at the same time could very easily overwhelm the system in short order.

Several attempts have been made to establish a vehicle-to-vehicle communication network. For example, FleetNet and CarTalk2000 have both developed a vehicle-to-vehicle communication network. Both of these systems used a GPS system in each vehicle for location information. FleetNet uses both fixed and moving nodes as the infrastructure for "ad-hoc" networks. The fixed node can act as a server router, a gateway router and a client server router. This use of a plurality of fixed nodes causes a significant financial cost and overhead to set up, maintain, and manage the infrastructure. Additionally, the FleetNet system uses position based routing and location awareness. Specifically, as the backbone for their system, position data plays a crucial role in the communication protocols deployed.

CarTalk 2000 also uses a position-based protocol. Each vehicle participating in the CarTalk2000-based inter-vehicle system must be equipped with GPS devices to detect its current position at any given time. Additionally, CarTalk2000 uses multiple different routing protocols, such as topological information routing, procedure routing, and reactive routing—such as Ad-hoc On-demand Distance-Vector Protocol, Dynamic Source Routing, hybrid routing, etc. Each of these routing protocols uses a complex and distinct set of protocol rules.

A major drawback of the CarTalk2000 system is the discovery of neighboring nodes significantly increases bandwidth traffic. Each node periodically sends a beacon to its neighboring cars reporting its existence. In high traffic areas this would result in constant beacon message collision.

However, these GPS networks have a significant drawback. In a high-mobility vehicle environment, the GPS information quickly becomes outdated. The exchange of constantly changing GPS information among vehicles, in order to perform GPS-positional routing, incurs too much protocol overhead and wireless bandwidth waste. As a result, such GPS-positional routing technology cannot achieve minimal communication latency or sustained multiple-hop throughput.

Accordingly, there exists a need to create an ad-hoc network capable of achieving the stringent VSC performance requirements while achieving minimal communication latency or sustained multiple-hop throughput without requiring excessive bandwidth and significant protocol overhead.

BRIEF SUMMARY OF THE INVENTION

Accordingly, an object of the invention is to create appropriate communication boundaries for a moving-device to moving-device communication by grouping a plurality of moving devices into a management group, such as a Local Peer Group ("LPG"), to coordinate and relay message transmission and to control the range and direction of the message propagation. Additionally, an object of the present invention is to provide a simple protocol for establishing and maintaining the Local Peer Groups, and a protocol for transmission of management data between nodes within the Local Peer Group.

Accordingly, provided herein is a method for establishing and maintaining an ad-hoc wireless network between a plurality of moving nodes. The nodes dynamically form the local peer group (LPG) without ordering the nodes. A group header node (GH) is selected from the plurality of moving nodes to control the LPG. The GH achieves this control by broadcasting a plurality of control messages, including a heartbeat message. The heartbeat message is broadcast at a fixed interval. The GH also determines if others of the plurality of moving nodes can join the LPG based upon a predetermined threshold value. The ad-hoc network is created by establishing a network link between the GH and others of the plurality of moving nodes, if it is determined that others of the plurality of moving nodes can join the LPG as group nodes (GNs).

The GH is assigned unique group header identification and functions to control and manage said LPG. The plurality of control messages further includes a group membership message that includes an identification of all GNs within the LPG, an LPG, a GH identification and a timestamp. The identification of GNs within the LPG is periodically updated via a status message broadcast from the GNs. The group membership list message can be included in the heartbeat message and broadcast at said fixed interval.

If there is more than one GHs within the LPG, header resolution occurs to select only one GH for the LPG. All of the GHs within the LPG broadcast a header resolution message. The GHs then operating in header resolution mode and performing header resolution to select only one GH as the GH for the LPG, based upon a predetermined selection criterion. After a new GH is selected, the new GH broadcasts a GH selected message and the other GHs join the LPG as GNs via the new GH. One of the predetermined selection criterion is the first GH that broadcasts the heartbeat message is selected as the new GH.

All nodes within a radio coverage range of the GH will receive the heartbeat message. The node will determine whether to broadcast a join Local Peer Group message to the GH. This determination is based upon a comparison of at least one parameter with a predetermined threshold value. The at least one parameter is the number of nodes within said LPG and said hop count. The predetermined threshold value is either the maximum number of nodes allowed in the LPG or the maximum hop. The node will broadcast the join local peer group message, if the either or both the at least one parameter does not exceed its corresponding predetermined threshold value. The node does not broadcast the join LPG message if either the at least one parameter exceeds its corresponding predetermined threshold value.

Alternatively, the node will broadcast join Local Peer Group message to the GH without a determination, and the GH will perform the determination based upon the same parameters and predetermined threshold values.

The method of establishing and maintaining the ad-hoc network further comprises the steps of receiving the heartbeat message from the GH at the GNs, randomly setting a timer to a value greater than the heartbeat period at each GN within the LPG and waiting for the next heartbeat message, and decreasing the timer when a heartbeat message is not received by the GN, wherein if the timer expires prior to receiving the next heartbeat message, the GN having the first timer to expire broadcasts its own heartbeat message and acts as a new GH, where the first GN that broadcasts the heartbeat message becomes the new GH for the LPG.

Further, in order to keep an updated list of GNs in the LPG, when a GN leaves the LPG, the identification of the GN is removed from the group membership message, if the status message is not received from the GN after a predetermined time interval. Alternatively, the GN can broadcast a message affirmatively leaving the LPG.

In another embodiment of the invention, the method further includes the step of selecting at least one gateway node for the LPG, said at least one gateway node functions to relay a plurality of messages from the GNs to the GH. The at least one gateway node collects a plurality of status messages received from the GNs, stores the plurality of status messages in memory after a predetermined period of time has elapsed and, broadcasts one message containing an aggregate of the plurality of status messages to said GH.

In yet another embodiment of the invention, the method further comprises the step of selecting at least one secondary GH. When the GH leaves the LPG, the at least one secondary GH becomes a new GH for the LPG.

Also disclosed is an ad-hoc wireless network system comprising at least one local peer group (LPG). The LPG is dynamically formed from a plurality of moving wireless devices, which are not ordered. The LPG includes one group header node (GH), which is selected from the plurality of moving wireless devices and is assigned unique group header identification. The GH controls and manages the LPG by broadcasting a plurality of control messages, including a heartbeat message at a fixed interval. The LPG also includes at least one group node (GN) which is created from the remaining moving wireless devices of the plurality of moving wireless devices within radio range of the GH when a predetermined threshold value has not been reached by the at least one LPG. The at least one GN can communicate with the GH via a network link created between the at least one GN and the GH. The at least one GN broadcasts a status message containing information about the GN to the GH.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION OF THE INVENTION

In accordance with the invention, nodes or moving devices are organized into manageable groups. These groups are used to coordinate transmission of data between the nodes. The groups are built based upon the relative location of neighboring nodes. This grouping or Local Peer Group ("LPG") is the basis for routing within a single LPG as well as between LPGs and organizing transmission in the ad-hoc wireless network to support wireless communications, including but not limited to, vehicle safety applications and information applications.

The purpose of the LPGs is to build degrees of coordination among neighboring nodes. These neighboring nodes are moving devices with wireless communications capabilities. A moving wireless device can be a PDA, laptop, cell phone, or a moving vehicle with a wireless device either attached or embedded. Specifically, moving devices include vehicles with associated communications devices which are installed the vehicles, or independently brought into the vehicles as well as pedestrians with communication devices. The preferred embodiment is moving vehicles with inherent communications devices.

There are two types of degrees of coordination; a first type is a tight coordination of moving devices within an immediate vicinity, which is used for intra-LPG communication for near-instantaneous messaging. For example, sending an urgent road-obstacle warning or another type of emergency or safety message would be performed using the inter-LPG messaging. These messages typically require a 100 msec latency.

A second type is a loose coordination, grouping moving devices in a neighborhood. This type of coordination is used to support inter-LPG communication among linked or interconnected LPGs. For example, inter-LPG communication can be used for roadway awareness application and for extending a driver's view.

An LPG is dynamically formed from a plurality of nodes in the immediate vicinity. Specifically, a first node broadcasts a radio signal; other nodes within the range of the first node have the ability to receive the radio signal. Since the LPG is formed based on a radio coverage, nodes within an LPG can communicate with each other via a single-hop or a multi-hop without a need for any fixed infrastructure.

Figure 1:
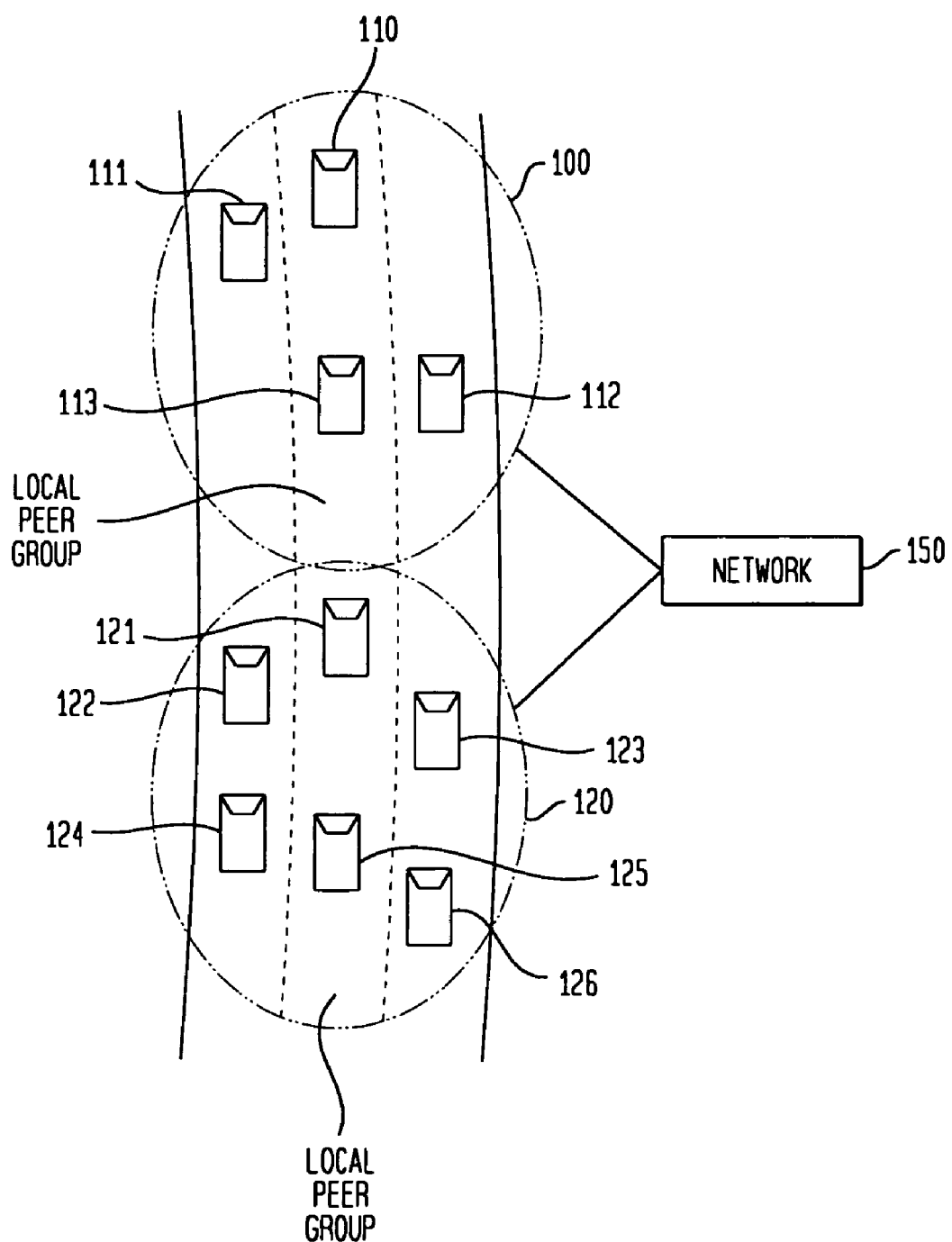
FIG. 1 illustrates an example of two local peer groups according to the invention.

FIG. 1 illustrates two LPGs, the first LPG 100 includes four nodes 110, 111, 112, 113, respectively. Each of these four nodes 110, 111, 112 and 113 can broadcast data to each other. The second LPG 120 includes nodes 121, 122, 123, 124, 125 and 126, respectively. Each of the nodes 121-126 can broadcast data to each other. This type of transmission is an intra-LPG transmission and occurs instantaneously. Nodes 110-113 in LPG 100 can broadcast data to nodes 121-125 in LPG 120 by using inter-LPG communication. The two LPGs, 100, 160 form the ad-hoc network 150.

In the first embodiment of the invention, an LPG is formed from two different types of nodes: a Group Header (GH) and a Group Node (GN).

A GH is a moving device or node within the LPG that is designated to maintain and control the LPG without any ordering of the nodes or any infrastructure.

Figure 2A:
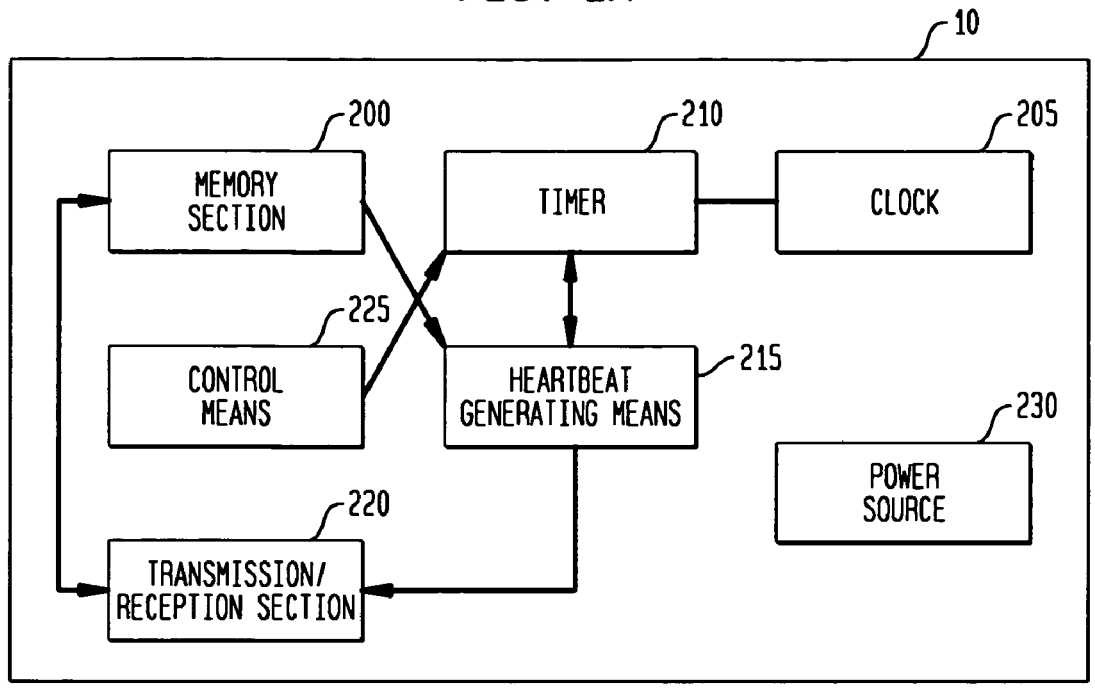
FIG. 2A illustrates a block diagram of a portion of internal structure in a Group Header node (GH) according to the invention.
Figure 2B:
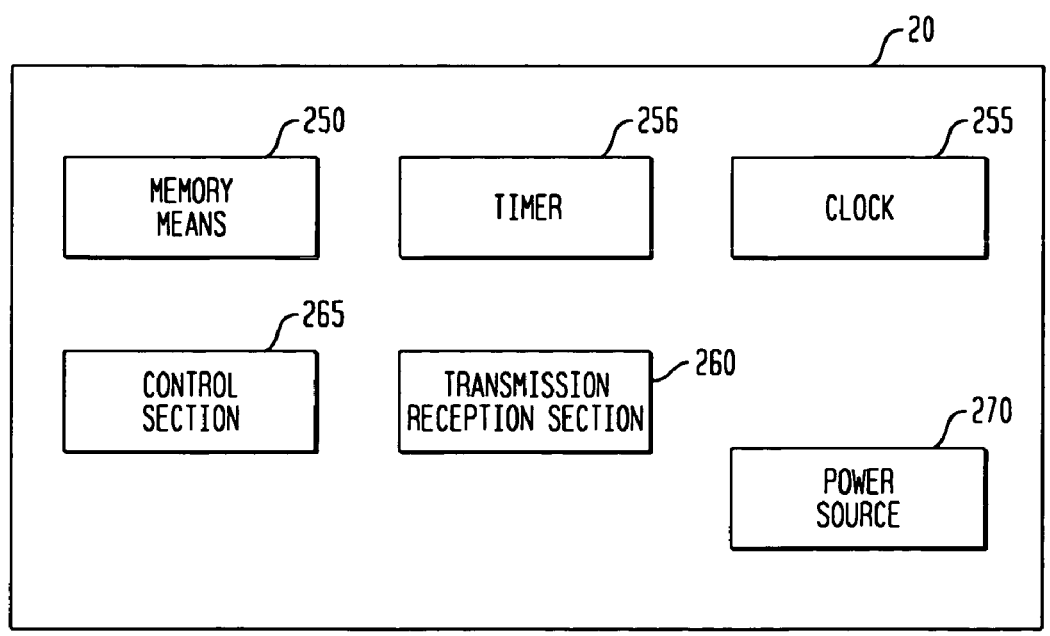
FIG. 2B illustrates a block diagram of a portion of the internal structure Group Node (GN) according to the invention.

Each node or moving wireless device is capable of operating as a GH or GN. As such, each node includes elements or means that allow the node to function or operate as a GH or GN, respectively. FIG. 2A and FIG. 2B illustrate several of the means or elements that allow the node to operate as a GH (FIG. 2A), or a GN (FIG. 2B). However, even when a node operates as either a GH or GN, all of the structural elements or means are present for both the GH and GN, but only specific elements function based upon the mode of operation.

Additionally, FIGS. 2A and 2B depict only certain means or features that function when the node is either a GH or GN, respectively; however, the features depicted are only for descriptive purposes and other features and elements can be and are included in the node. Additionally, the specific name of the feature such as a memory section for the GH and memory means for the GN are also used for descriptive purposes to avoid confusion between the two features and their function. However, in actuality the element, i.e., memory, is the same for all nodes, but the element functions differently when the node operates as a GH versus a GN.

FIG. 2A illustrates a block diagram of a portion of internal structure of the wireless device that is coupled to a moving device that functions when a node is selected as a GH 10. When the moving device or node is elected as a GH 10, at least the following elements function, a memory section 200, a clock 205, a timer 210, a heartbeat generating means 215, a transmission/reception section 220, a control means 225 and a power source 230. The memory section 200 can be any type of memory including DRAM, SRAM or Flash. In a preferred embodiment, the short-term memory is cache. The memory section stores information regarding the LPG such as the LPG ID, GH ID, the group listing, a predetermined maximum LPG size, the number of nodes in the LPG, and other types of control parameters.

The clock 205 is used to maintain the timing for the GH 10. Specifically, the clock 205 functions as an internal clock and is used as a basis for setting a timer 210. The timer 210 is used to determine when to broadcast the heartbeat message 510, i.e., determines the heartbeat interval (T). The control means 225 or microprocessor control all of the processes of the GH including generation of the heartbeat message 510, when to broadcast the heartbeat message 510 based upon the timer 210, and whether to allow or deny a node from entering the GH. Additionally, the control means also is responsible for header resolution, which will be described later in detail. The heartbeat generating means 215 is responsible for creating or generating the heartbeat message 510 from data, which is stored in the memory section 200.

The GH 10 periodically sends out a signal called a "heartbeat" or heartbeat message 510 identifying the LPG and providing information regarding the LPG. A heartbeat message 510 will be described in detail later. This period is a fixed interval (T). The value of the interval (T) is selectable based on design or operational needs. The GH 10 also maintains a list of all of the nodes in the LPG. This list is stored in a memory section 200. This list constantly changes based upon nodes entering and leaving the LPG. This list includes a time stamp of when a node enters the LPG or when a status update from the node (thus signifies the node is still in the LPG) is received by GH 10. The list is used for various management and control functions for the LPG. For example, the list can be used to track group size, block a specific node and for header resolution. Additionally, this list is periodically broadcast to all of the other nodes in the LPG.

The LPG heartbeat message 510 is broadcast to all nodes within a radio vicinity of the GH 10. The message is transmitted via a control channel from the GH 10 to other nodes. This channel may be a wireless channel dedicated to control and signaling use, or may be a wireless channel shared by all nodes for information exchanges. The use of such channel(s) may be governed by some wireless medium access control protocol(s). The heartbeat message 510 includes a unique identifier that includes both the LPG ID and the GH ID, which will be explained in further detail below. The heartbeat message 510 or message further includes other parameters of the LPG, such as the time of the next heartbeat, the number of nodes within the LPG, a predetermined maximum side for the LPG, the number of hops for transmission, and the maximum threshold for the number of hops allowed. In an alternate embodiment of the invention, the heartbeat message 510 can also include a group membership list message 540.

The GH 10 sends out the group membership list message 540 to all active GNs 20 within an LPG. The group membership list message 540 is used for header resolution and also for a GH to keep other GNs updated on the LPG status. The group membership list message 540 includes the LPG ID and GH ID, a timestamp of when the group membership list message is sent and an ID for each GN.

The GH 10 controls the LPG. All other nodes join the LPG via the GH 10. A GH 10 will receive a join message 550 from a node and determine whether the node can join the LPG. The determination will be based upon at least one predetermined threshold value. A predetermined threshold value can be the maximum node size for the LPG or the maximum hop count allowed for the LPG.

Specifically, once the GH 10 receives the join message 550 from a node via the transmission/reception section, the control means 225 will retrieve either a node count or a hop count from memory 200. Additionally, the control means 225 will retrieve the corresponding predetermined threshold value. The control means 225 will then compare the predetermined threshold value with the corresponding parameter and determine whether the predetermined threshold value has been exceeded. For example, the GH 10 will compare the node count value with the maximum node size value. Alternatively, the GH 10 can compare the hop count with the maximum hop count allowed. Alternatively, both comparisons can be made.

If either or both predetermined threshold values have been exceeded, the GH 10 will deny the node entry into the LPG. The GH 10 will then send a rejection message to the node. If the predetermined threshold value has not been exceeded, then the GH 10 will allow the node entry. The GH 10 will then send an acceptance message to the node. Once the node becomes a GN 20, the GH 10 will then increment the node count and store the new value in the memory section.

Typically, there is only one GH 10 within an LPG. All other nodes within the LPG are a general node or a group node ("GN"). A GN 20 enters the LPG through the GH 10 and periodically broadcasts a status signal 560 to the GN 20. These nodes broadcast a node join message 550 to the GH 10 indicating that the node would like to join the LPG. This message includes a node ID, and a TimeStamp. Once the node joins the LPG and becomes a GN 20, the GN 20 periodically broadcasts a node status message 560 to the GH 10. This GN status message 560 is used by the GH 10 to maintain an updated membership list. The node status message 560 is similar to the join message 550 as the message includes a node ID and a Timestamp. An external clock within the GN determines the timestamp. Typically, there is more than one GN 20 within a LPG. Accordingly, to avoid interference due to a plurality of node status messages 560 being broadcast at once, the node status message 560 is broadcast at a randomly selected interval that is less than the heartbeat interval (T). Therefore, each GN 20 will broadcast its node status message 560 at a different time from another GN 20.

FIG. 2B illustrates a block diagram of a portion of internal structure of the wireless device that is coupled to a moving device that functions when a node joins a LPG and becomes a GN. The wireless device coupled to the node or moving device includes a memory means 250, a clock 255, a timer 256, a transmission/reception section 260, a control means 265 and a power source 270. The memory means 250 can be any type of memory including DRAM, SRAM, or Flash. In a preferred embodiment, the short-term memory is cache. The clock 255 is used to maintain the timing for the GN 20. Specifically, the clock 255 functions as an internal clock and is used as a basis for setting a timer 256 where the timer 256 is used to determine when to broadcast a signal. The control section 265 or microprocessor control all of the processes of the GN 20 including transmission or broadcasting of signals to other GNs or to the GH 10, requesting to enter a LPG and storing information into the memory means.

Periodically a GN 20 will send out a status message 560 to the GH 10 and will receive the heartbeat message 510 from the GH 10. A new node in a vicinity of an LPG will detect an LPG either by communicating to a nearby neighbor node which is already part of a group or by detecting the LPG heartbeat which is sent out periodically. Then the new node can ask the GH 10 to join the LPG. Information regarding a specific LPG is determined from the heartbeat message 510 which is received from a GH 10.

The GH 10 will decide whether the new node will be able to join the LPG. If the GH 10 determines that the new node can join, the new node will join the group as a GN 20.

Operation of the GN 20 will now be described. The GN 20 will receive a heartbeat message 510 from a GH 10. The heartbeat message 510 will contain information such as a unique identifier for the LPG, and other types of control information, as will be described in detail later. After receiving the heartbeat message 510, the control section 265 in the GN 20 will set the timer 256 to a random value with a minimum value equal to the heartbeat period (T+Δ). If the next heartbeat is received within the period, the GN 20 knows that a GH 10 is still in its vicinity. If no heartbeat is heard a GN 20 will elect itself as the GH 10.

Specifically, an election of a new GH is done when the current GH heartbeat message 510 is not heard in a time greater than T, the heartbeat interval. Each GN 20 sets its timer 256 to a random value greater than T, e.g., T+Δ, and waits for the heartbeat message 510. If the timer expires before the heartbeat message 510 is received either from the current GH or a new GH, the node will elect itself as the new GH and send out a new heartbeat message 510 so other nodes in the LPG know there is a current GH. The first node with its timer expired will send out its own heartbeat message 510 with its current known LPG ID and elect itself as the GH 10. When an LPG heartbeat message 510 is received, the other nodes (GN) 20 compare it to the previously LPG heartbeat information stored in the memory means 250, containing at least a unique identifier that identifies the LPG. If the LPG ID is the same but the GH has changed, the node recognizes that the group may have split or the previous GH 10 has moved away (e.g., a GH vehicle has taken an exit from highway, made a different turn at road intersection, or simply separated from the group due to different vehicle speeds). A change in GH 10 could also imply that the node GN 20 has moved into a group with the same LPG ID as the previous group. If the LPG ID is different and the GH 10 is different, the node will know it has moved into a new group and join the group via the GH 10.

In any of these cases, the node will eventually determine that it is part of the LPG via the heartbeat information. If the node discovered for some reason that it has not been made part of the LPG, then the node can join via a request to the GH.

A unique identifier identifies each LPG. There are several possible formats for the unique identifiers. The identification of the LPG can be via the unique identifier, which is encoded based upon a GH number. However, as the GH 10 changes, the LPG's unique identifier would change as well, and would result in a node not being able to tell if its LPG change or just the ID for the LPG. On the other hand, an LPG unique identifier can be fixed to the original ID when a GH 10 leaves. However, this might lead to LPG unique identifier duplication when a single LPG splits. Two or more groups will have the same unique identifier. In the preferred embodiment the unique identifier is encoded based upon both a LPG ID and GH ID numbers to uniquely identify the LPG. A GH 10 is given a GH ID number. The first GH 10 in the network is labeled GH1, and the next will be GH2, and so on. Initialized, the LPG ID is tied to the GH ID number. Therefore, the GH number initially determines the unique identifier, but as the GH changes, the LPG ID unique identifier changes to include the new GH number. Additionally, when a single LPG splits into multiple LPG's, the LPG ID would be common to the two or more new LPG's but the GH ID would be different and can be used to distinguish the LPG's with the same LPG ID because the unique identifier would be different.

Figure 3:
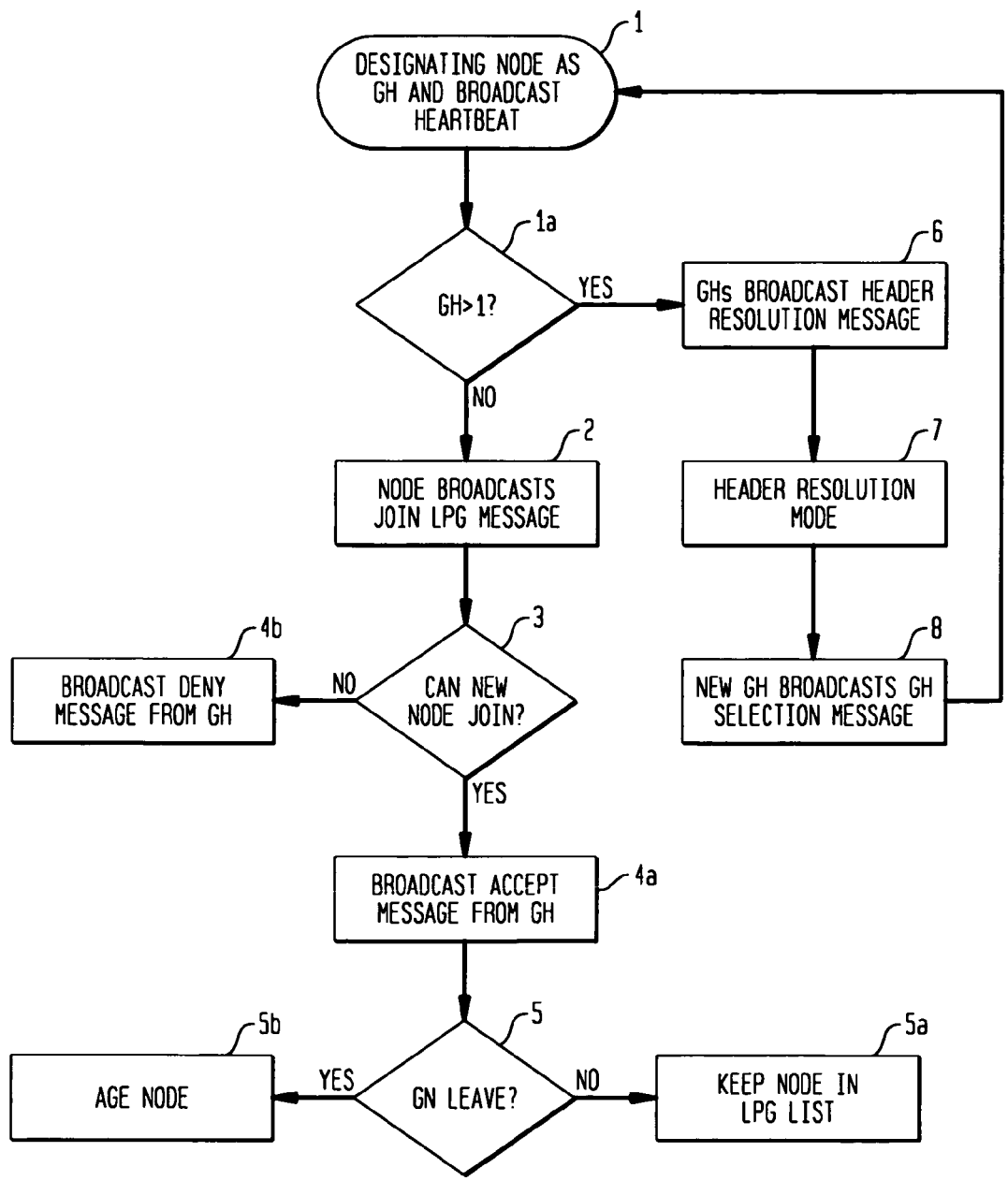
FIG. 3 illustrates a flow chart for the formation and maintenance of a LPG according to an embodiment of the invention.

An LPG is formed from more than one node within vicinity. FIG. 3 illustrates the process of forming and maintaining a LPG from one or more nodes. Initially, each moving device may have identified itself as the GH Step 1 (for an LPG containing just itself). As moving devices come closer with each other (e.g., vehicles at intersections, at highway on-ramps, or due to vehicle speed differentials on the roadway), they come within the same radio coverage of each other (single or multiple hop). These moving devices, now within the same radio coverage, begin to form LPG containing more than one node. Typically, the first node to send out a heartbeat message 510 is deemed the GH 10. Each individual node starts off as its own LPG and thus is deemed the GH 10 in its own LPG. As such, each GH 10 broadcasts its heartbeat message 510, as will be illustrated in FIG. 5. The maximum physical size of the LPG is determined by the radial distance that a radio wave can travel from the GH 10. Any node within this radial distance can be a GN 20 within the LPG. If there is more than one GH within the LPG header resolution occurs.

Figure 7:
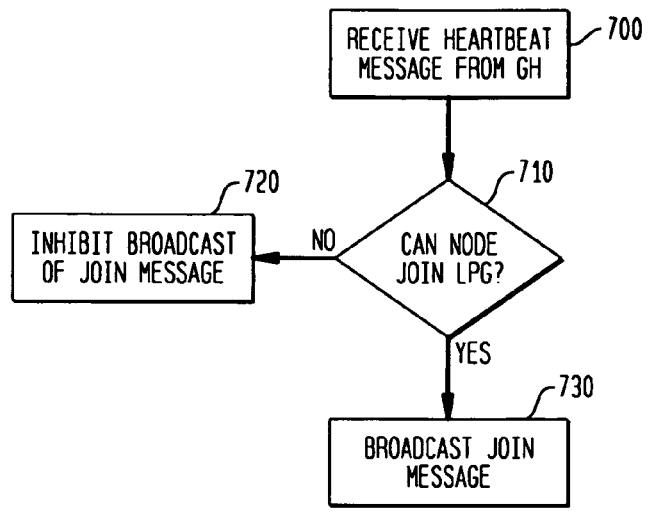
FIG. 7 illustrates an alternate method of determining whether a node can join an LPG.

A new node in a vicinity of an LPG will detect an LPG either by communicating to a nearby neighbor node which is already part of a group or by detecting the LPG heartbeat which is sent out periodically. Then the new node can ask the GH 10 to join the LPG Step 2. The GH will then determine if the node can join the LPG, Step 3. Based upon this determination, the GH can accept (Step 4a) the node or deny (Step 4b) the node entry into the LPG. The GH 10 can deny joining if a predetermined number of nodes already are in the LPG or if the number of hops needed for transmission exceeds a threshold limit, at Step 4b. Alternatively, a new node can determine if it will be able to join the group itself based upon a predetermined criteria as illustrated in FIG. 7 by checking a size limit from the received LPG heartbeat information. This avoids additional unnecessary messaging to the GH 10 if the size limit has already been reached. This will occur prior to broadcasting the join message 550.

Specifically, the GN 20 will receive the heartbeat message 510 from the GH 10, at Step 700. This heartbeat message 510 will include the node count, a predetermined maximum node size for the LPH, the hop count and the predetermined maximum hop count. The GN 20 will then determine whether it can join the LPG based upon a comparison of either or both the node count or hop count with it corresponding threshold value, i.e., predetermined maximum LPG node size or predetermined maximum hop count, at Step 710. The control section 265, in the GN 20, will then compare the predetermined threshold value with the corresponding parameter and determine whether the predetermined threshold value has been exceeded. For example, the GN 20 will compare the node count value with the maximum LPG node size value. Alternatively, the GN 20 can compare the hop count with the maximum hop count allowed. Alternatively, both comparisons can be made.

If either or both predetermined threshold values have been exceeded, the GN 20 will not broadcast its join message 550 to the GH 10, at Step 720. The GN 20 will then attempt to join another LPG via a different GH 10. If both predetermined threshold values have not been exceeded, then the GN 20 will broadcast the join message 550 to the GH 10, at Step 730. Upon receipt of this join message 550, since the GN already determined that neither predetermined threshold value had been reached, the GN 10 will broadcast an acceptance message. The GN will then begin to broadcast status messages 560 periodically.

Since it is the responsibility of the GH to maintain a current list of all GNs within the LPG, the GH will continuously monitor if a GN has left the LPG, Step 5. When a node leaves an LPG, the GH 10 will "age" the GN 20 from the group list, that is, stored in the GH's memory section 200, since it will not receive a periodic member status update from the leaving node. The aging process works as follows: GH 10 keeps each GN 20's membership alive for a period of time, after receiving a status message 560 from the GN 20 Step 5a. When the GN 20 leaves the LPG, GH 10 will stop receiving status message 560 from the GN 20 and stop keeping the GN 20 membership in the LPG. The GH 10 will then remove the node from the LPG list after some time Step 5b. The actual time limit, by which GH 10 retains the membership of a GH 20 without receiving any status update from the GH 20, is a system design or operational parameter. For example, the time limit may be on the order of T+D plus the maximum period of sending a status message 560 by a GN 20. At the end of the time limit, GH 10 will remove the record of GN 20 from its memory 200. This will help the GH 10 keep an updated membership list, as well as a current count on the number of nodes in the LPG so that new nodes will not be allowed membership into the LPG if the predetermined maximum size value has not been reached. Alternatively, the leaving node can implicitly send a message to the GH 10 that it is no longer part of the LPG.

As described above, the heartbeat message 510 can include the group membership list message 540. Alternatively, the group membership list message 540 can be a separately transmitted message. There are also several other types of messages that are broadcast by the GH 10. For example, a header resolution message 520 is broadcast to initiate the process of header resolution. This type of message is only broadcast when there is more than one GH 10 within an LPG. Furthermore, the header resolution message 520 is only broadcast from a GH 10 to another GH 10 within the LPG. The header resolution message 520 includes a GH ID, a LPG ID and the group membership list.

After header resolution occurs, an additional message is broadcast from GH 10 to GH 10. A GH selection message 530 is used to notify the GHs 10 of the selection of the new GH for the LPG. The GH selection message 530 includes that GH ID and LPG ID for the group.

If two or more active GHs 10 are in the same LPG or in the same vicinity, a header resolution occurs determined at Step 1a. This is to avoid having multiple GHs 10 within the same LPG, since multiple GHs 10 in the same LPG will result in redundant (potentially even confusing) control signals being transmitted or broadcast within the LPG and waste bandwidth and capacity. Header resolution functions to select one GH from at least two GHs. Each GH broadcasts a GH Header Resolution message 520, at Step 6. This informs all GHs to operate in header resolution mode, at Step 7. A new GH is selected based upon a pre-determined selection criterion. There are four different selection criteria; any one can be used. The first criterion is that the GH with the lowest ID number is selected. The second criterion is that the GH with the highest ID number is selected. A third selection criterion can be the GH that broadcasts the first heartbeat message 510 is selected. Lastly, the GH having the most current nodes in the LPG is selected, i.e., most matches with the group membership list.

Figure 3A:
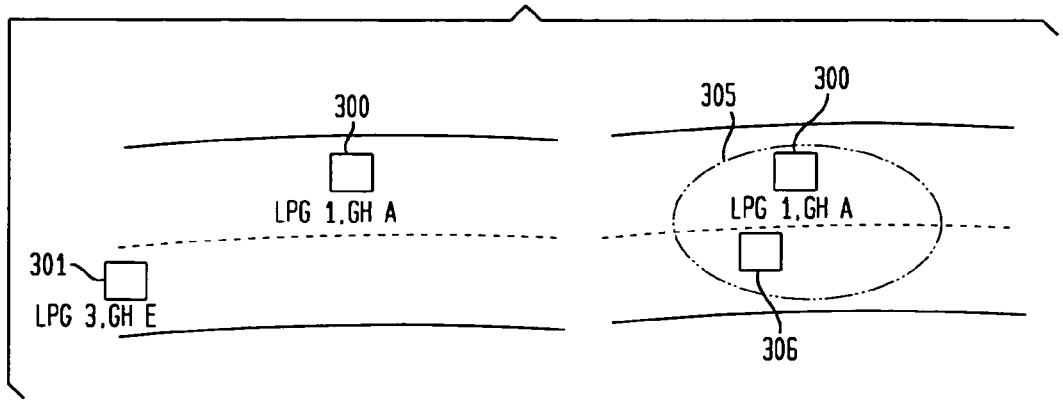
FIGS. 3A-3C illustrate three different examples of header resolution using the header resolution rules according to an embodiment of the invention.
Figure 3B:
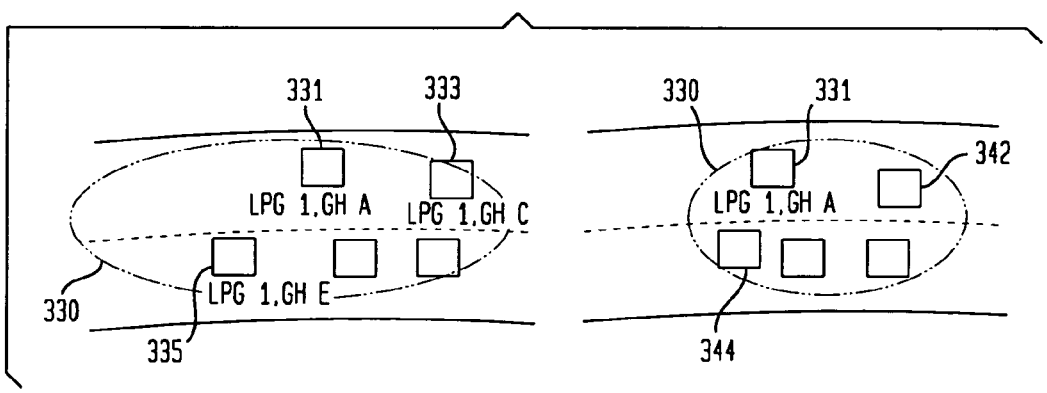
Figure 3C:
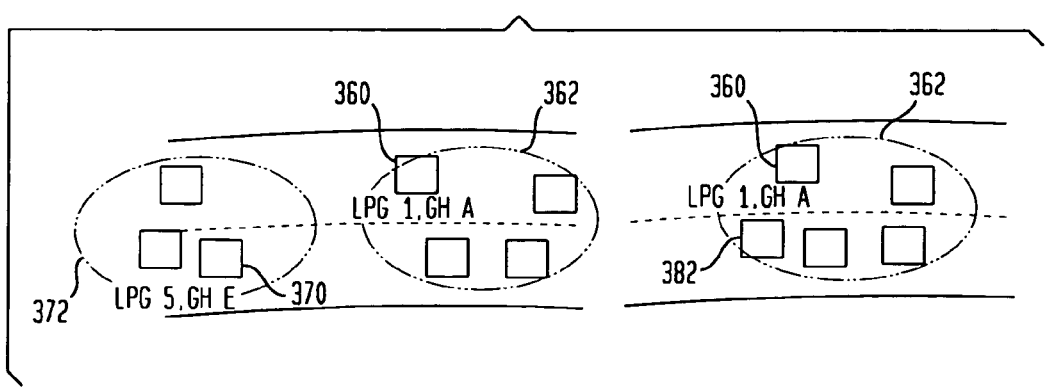

FIGS. 3A-3C illustrate three different examples of header resolution according to an embodiment of the invention, using one of the header resolution rules. FIG. 3A illustrates an example of when two GHs 10 (each LPG is size 1) come into the same vicinity. Each individual node starts off as its own LPG and thus is the GH 10 in its LPG. When two single-node LPGs move close to each other they need to resolve who will be the new GH for the LPG of size 2. One of the GHs 10 will remain is the GH 10 for the LPG whereas the other will become a GN 20 of the LPG.

In FIG. 3A, each node GH A and GH E, respectively (300 and 301), will hear each other's heartbeat message 510. GH A 300 is in LPG 1 and GH E 301 is in LPG 3. Upon receipt thereof, the GHs 10 will broadcast the header resolution message 520, and the nodes GH A 300 and GH E 301 will exchange group lists to decide if the nodes are duplicating a GH 10 in the same LPG. Alternatively, the group list will be part of the header resolution message 520. In this configuration with only one node in the LPG, the nodes will discover that they are the only node in each LPG by examining this group list. Each group list would only have one node. The group list is compared with the group list in memory or cache. This indicates that one of the nodes GH A 300 and GH E 301 is redundant GHs 10. Therefore, one of the nodes GH A 300 or GH E 301 will remain the GH 10 for the LPG and the other node will be just a regular GN 20 and will join the LPG via the new GH 10.

This selection process uses a predefined selection criterion to determine which of the nodes will be selected as the GH for the LPG. For example, the node having the lower ID can be selected as the GH. Alternatively, the node with the higher ID number can be selected as the GH. The selection criteria will be predetermined prior to the creation of the LPG. As depicted in the example in FIG. 3A, the node with the lower ID remained the GH 10 for the LPG. Additionally, the LPG ID of the GH 10 that remained as the GH 10 for the new LPG determines the LPG ID for the new LPG. For example, as illustrated in FIG. 3A, the LPG ID for the new group is LPG 1 305 and the GN is node E 306. After header resolution is finished the GH 10 will broadcast the GH selection message 530 to the old GH informing the node that it is the new GH.

FIG. 3B illustrates a second example of header resolution. In this example there are two or more GH 10 in a single LPG because one of the randomly set timers 256, in one or more GN 20 expired without receiving a heartbeat message 510 from a GH 10, potentially indicating that a GH 10 had left the LPG. The GN 20 assumes that the old GH 10 has left the LPG and thus elects itself as the new GH 10. However, there are several reasons as to why the GN 20 failed to receive the heartbeat message 510. For example, congestion in the wireless channel caused by a plurality of other signals being sent over the same bandwidth can cause interference with the heartbeat message 510 and prevent a GN from receiving the signal.

Accordingly, there will be multiple GH heartbeat messages 510 being broadcast and received within the same LPG. As depicted in FIG. 3B, there are three GHs 10 in the LPG 330, namely, GH A 331, GH C 333, and GH E 335. Each of the GHs 331, 333, and 335, respectively, will compare the received group lists, which was part of the header resolution message 520, with the group list that is stored in the memory section 200. However, since the GHs 331, 333, and 335, respectively, were already in the same LPG 330, all or substantially all of the nodes on the list will be the same. But, an LPG cannot have more than one GH, as this would be redundant control, therefore, one of the nodes GH 331, 333, 335 will remain the GH for the LPG and the other nodes will be just a regular GN and will join the LPG via the new GH.

This selection process uses a predefined selection criterion to determine which of the nodes will be selected as the GH for the LPG. For example, the node that has already sent out the new heartbeat message 510 will be selected as the new GH for the LPG 330. Alternatively the original GH can be re-selected as the new GH. The selection criteria will be predetermined prior to the creation of the LPG. As depicted in the example in FIG. 3B, the LPG 330 had three GHs 331, 333, 335, GH A, GH C, and GH E, respectively, at a given time. For the purposes of this example, GH C 333 is the original GH, however, when the timer 256 at the GH A 331 expired, GH A broadcasts a heartbeat message 510 and elects itself as a GH 10. In a preferred embodiment, GH A 331 becomes the new GH 331 for the LPG because GH A 331 sent out the most recent heartbeat message 510. The other two GHs, GH C 333, and GH E 335 become regular nodes GN 342, and 344, respectively. Additionally, the LPG ID of GH A 331 determines the LPG ID for the remaining LPG. After header resolution is finished the GH 10 will broadcast the GH selection message 530 to the old GH informing the node that it is the new GH.

FIG. 3C illustrates a third example of header resolution. In the third example, there are two or more GHs in a LPG because a GH from another LPG moves into a LPG of a size greater than one which already has a GH. As depicted in FIG. 3C, node A is the GH A 360 for LPG 362 and node E is the GH E 370 for the LPG 372. Each of the two GHs 360 and 370, respectively, will broadcast its heartbeat message 510 and each of the two GHs 360 and 370, respectively, will receive each other's heartbeat message 510 since GH E for LPG 372 has moved into the wireless receiving range of LPG 362. This heartbeat message 510 can include a group list signal containing information regarding all nodes within its LPG, 362 and 372, respectively. Alternatively, the GHs 360 and 370 can broadcast a separate group list signal. Additionally, once it is determined that more than one GH exists within the LPG, the GHs 360 and 370 will broadcast a header resolution message 510 including the group membership list.

Each of the GHs 360 and 370, respectively, will compare the received group membership lists with the group list that is stored in the memory section 200. The group lists will have no or few nodes in common since the GH were from a different LPG. Alternatively, each GH 360 and 370 can query some or all of the nodes on its group list that is stored in its memory section 200 to determine if a node is still in the LPG. If one GH determines that the nodes are not the same, e.g., not in the LPG, then the GH (E) knows it has moved into a new group (LPG 362). Since there are now more than one GH within the LPG (LPG 362), header resolution must select one of the nodes to be the GH because an LPG cannot have more than one GH, as this would be redundant control. Therefore, in FIG. 3C, one of the nodes GH 360 will remain the GH for the LPG and the other nodes will be just a regular GN and will join the LPG via the remaining GH.

This selection process uses a predefined selection criterion to determine which of the nodes will be selected as the GH for the LPG. For example, the node that has the most current group of nodes will be selected as the GH for the LPG 362, e.g., the GH that has the greatest number of matches of nodes when comparing a group list in the memory section 200 with the received group list broadcast from the other GH. Alternatively, a GH that determines that it has moved into another LPG can be demoted to a GN in the LPG and join the LPG via the GH since the LPG already has a GH. The selection criteria will be predetermined prior to the creation of the LPG. As depicted in the example in FIG. 3C, the LPG 362 and 372 each had only one GH, 360 and 370, respectively. GH E 370 entered the vicinity of LPG 362 causing two GHs to be in LPG 360. Both GHs 360 and 370 broadcast their heartbeat message 510.

In a preferred embodiment, GH A 360 becomes the new GH for the LPG because GH 360 will have the most nodes in common with the current LPG using either selection criteria. The other GH E 370, becomes a regular node or GN 382 in the LPG. Additionally, the LPG ID of GH A 360 determines the LPG ID for the LPG. After header resolution is finished the GH will broadcast the GH selection message 530 to the old GH informing the node that it is the new GH. After header resolution is finished, the new GH broadcasts a GH selection message 530, at Step 8. The process then returns to Step 1, and the new GH broadcasts a heartbeat message 510.

Figure 4:
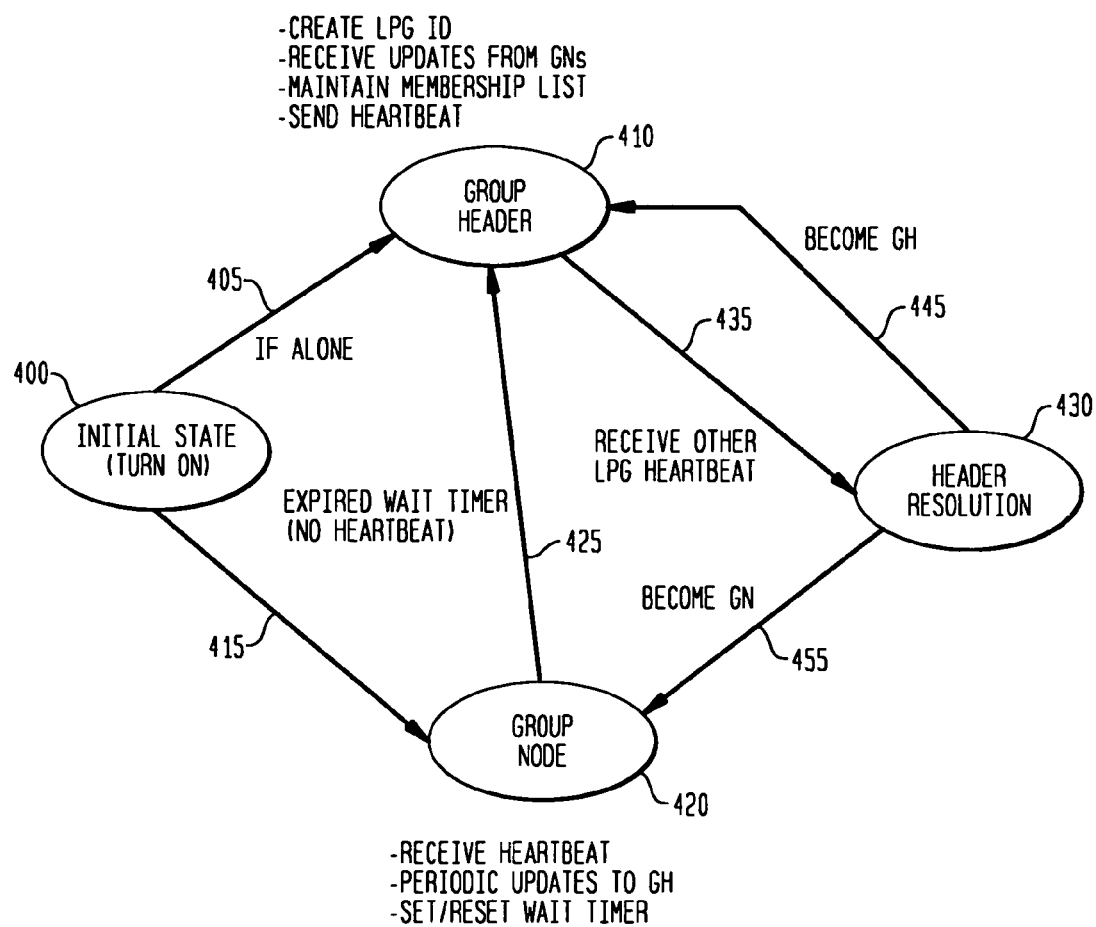
FIG. 4 illustrates a finite state machine for the GH-based LPG formation in accordance with an embodiment of the invention.

FIG. 4 illustrates a finite state machine for the GH-based LPG formation. For the group header (GH)-based LPG a node (moving device) is selected/elected as the GH. Each moving device is initialized during a turn on state 400. If the vehicle or node is alone, the moving device changes its state from state 400 to state 410 by becoming its own LPG and GH via transition 405. When other moving devices are encountered, the moving device changes its state from state 400 to state 420 by joining the group as a group node (GN) via transition 415. Alternatively, when other nodes are encountered each sending out their own heartbeat message 510 at transition 435, header resolution occurs 430. As described above, header resolution occurs when more than one GH is in our LPG and the broadcast of multiple heartbeats occurs at transition 435. Header resolution 430 causes one node to become a GH via the transition 445 from state 430 to state 410 and all other nodes to become a GN via the transition 455 from state 430 to state 420. Each node has the capability of being a GH or a GN. For example, when a GH in an LPG is gone, a group node can become the new GH and when header resolution occurs, a GH can become a group node. Additionally, if a set timer 256 in the GN expires, a group node can become GH via transition 425 from state 420 to state 410.

Figure 5:
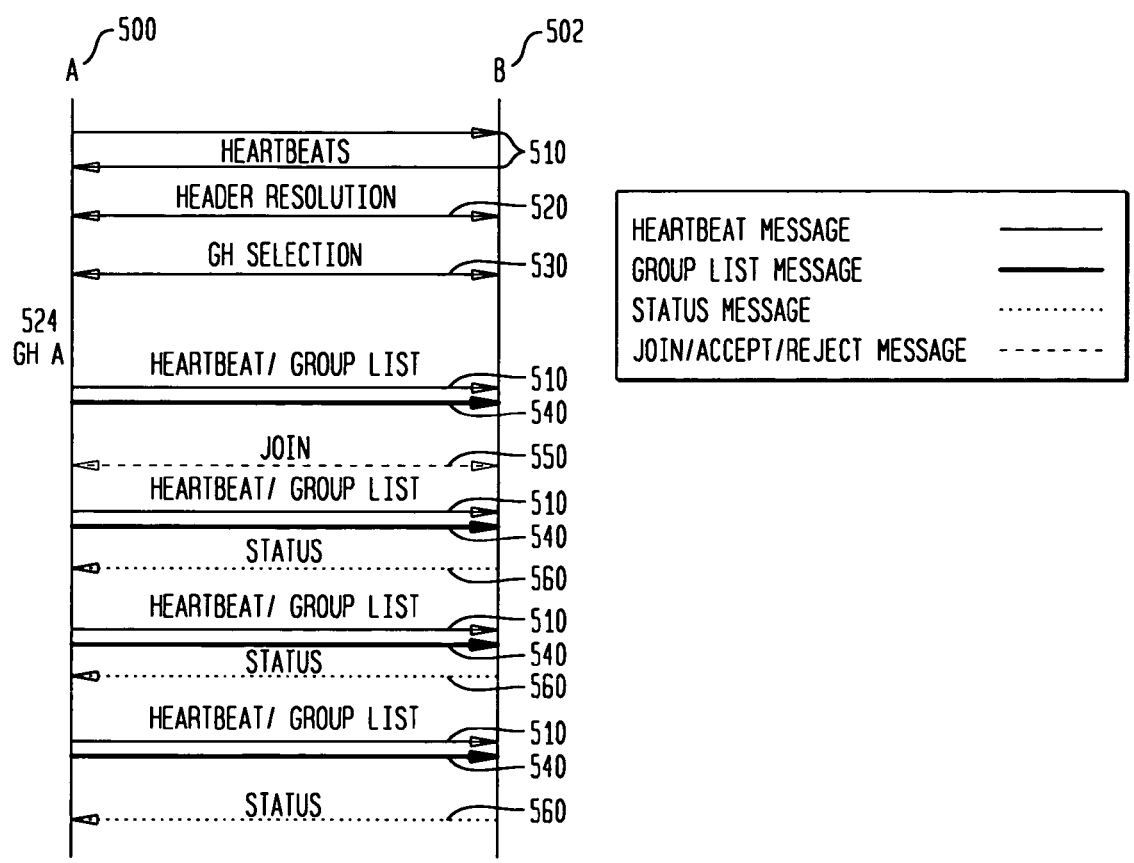
FIG. 5 illustrates formation of a LPG from two nodes according to an embodiment of the invention.

FIG. 5 illustrates an example of the formation of a LPG from two nodes based upon a GH controlled LPG, in accordance with an embodiment of the invention.

FIG. 5 depicts two nodes A 500 and B 502, each of these nodes initially form its own LPG and become the GH. Both will broadcast and receive each other's heartbeat message 510. Upon receipt of the signal, both GHs 10 will realize that another GH is within the vicinity and broadcast a header resolution message 520. Both then enter header resolution mode (Step 7) and one GH 10 will be selected for a LPG with a group size of two. As described above and depicted in FIG. 3A, a node will be selected using a predefined selection criterion. Node A 500 will be chosen as the GH 10 to become GH A 504 and node B 502 will have to join the LPG via GH A 504. GH A 504 will broadcast a GH selection message 530 informing node B 502. Each predetermined fixed period (T), GH A 504 will broadcast its heartbeat message 510. GH A 504 will also send out a group membership list message 540. This membership list 540 can be included in the heartbeat message 510. Alternatively, the group membership list message 540 can be a separate message and could be transmitted or broadcast less frequently (T+b). When node B 502 receives this heartbeat message 510 node B 502 will broadcast a join LPG message 550 to the GH 10 requesting that the node join the LPG.

GH A 504 will determine whether to allow node B 502 to enter the LPG. This determination can be based upon the maximum allowed size for the LPG. Additionally, this can be determined by the maximum allowed hops for the group. These criteria are provided to limit the time that it takes for information to be broadcast to all of the GNs 20 within the LPG, and to limit the number of control messages broadcast intra-LPG. This is an important consideration for LPG to support vehicle safety communications applications.

Specifically, the GH 10 can limit the number of hops the LPG heartbeat can travel before it is dropped. However, as the GH 10 changes, the members of the group may change since the new GH may be in a different part of the LPG and the same hop count will change the structure of the LPG, e.g., some nodes which were part of the LPG will move out and nodes which are not part of the LPG can now be part of it. One way to keep the membership of the LPG stable as the GH 10 changes is to change the timer 256 periods such that nodes that are one hop away from the GH 10 will expire earlier than nodes that are more hops away. This can improve the chance that nodes closer to the old GH are more likely to take over if the GH 10 moves away. Thus the membership of the LPG may not change too much except for the outer nodes.

As depicted in FIG. 5, if GH A 504 allows node B 502 to enter the LPG, node B 502 will become GN B. GN B will then broadcast a status message 560 to GH A 504 sending status updates to GH A 504 so that GH A 504 can maintain an updated membership list of all the nodes in the group. The status messages 560 will be broadcast from a GN 20 to the GH 10 at random time intervals (less than the heartbeat interval T) over the wireless channel. This is to avoid flooding the wireless channel with status messages 560 all broadcast from the GNs 20 to the GH 10 at once. Ideally, each GN 20 would broadcast the status message 560 at different times.

As more nodes enter the vicinity of the LPG, each new node will receive the GH's heartbeat message 510 and request to join the LPG by broadcasting the join message 550. As long as maximum allowed size for the LPG or maximum allowed hops has not been reached, the GH 10 will allow the node to be a GN 20 of the group.

Merging of LPGs occurs when more than one LPG is in the same vicinity, however, the entire LPG does not merge with the other LPG, collectively. Nodes from one LPG "merge" with the other LPG, one node at a time, by joining the other LPG via the GH 10. This is typical for vehicles on roadways where individual vehicle travels at its own speed and at certain spacing between other vehicles. Therefore, merging of vehicles into an LPG typically occurs one vehicle at a time. This also ensures that the maximum allowed size for the LPG or maximum allowed hop count has not been reached.

Figure 6A:
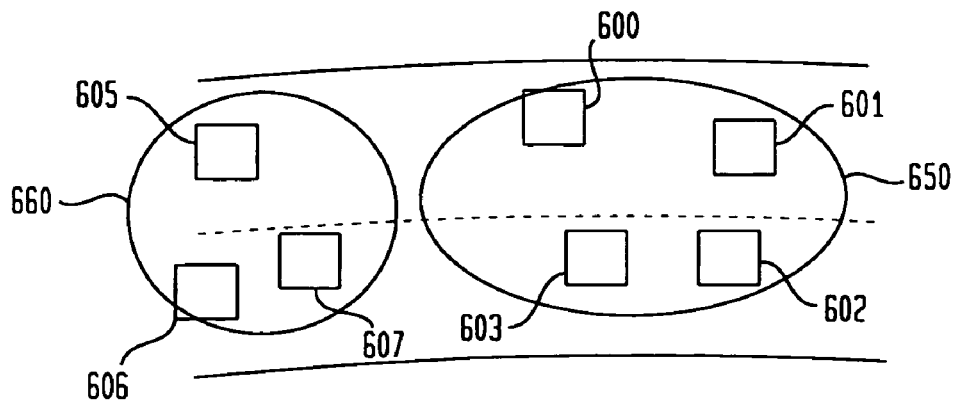
FIGS. 6A-C illustrate three different examples of potential merging scenarios in accordance with an embodiment of the invention.
Figure 6B:
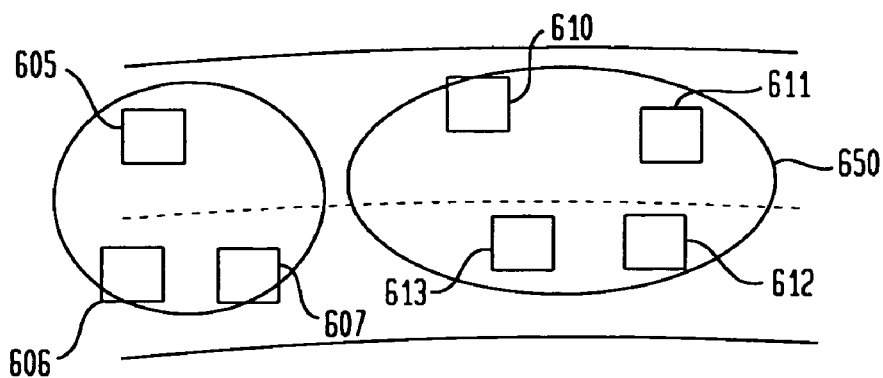
Figure 6C:
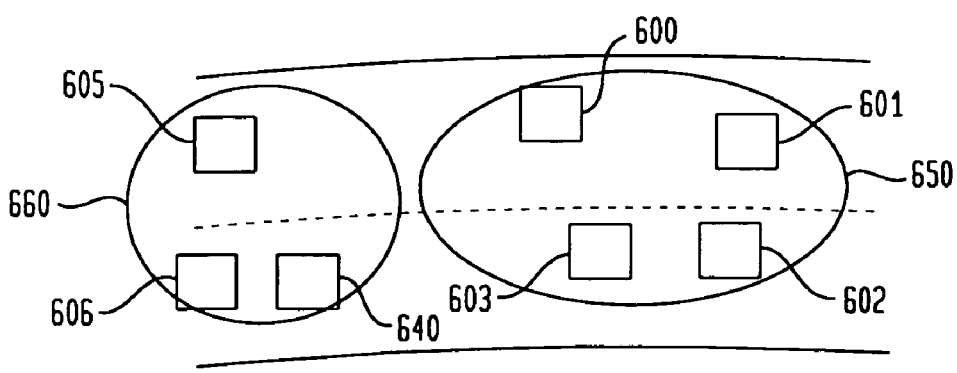

FIGS. 6A-C illustrate three different examples of potential merging scenarios. FIG. 6A depicts the first example where only one of the two LPGs group has a GH 10, GH A 600. LPG 1 650 consists of four nodes A, B, C, D, node A 600 is the GH 10, and nodes B, C, and D are the GNs 601, 602, and 603, respectively. LPG 2 660 includes 3 nodes, E, P and Q 605, 606, and 607, respectively. LPG 2 660 has no GH. LPG 2 660 will merge with LPG 1 650 by having each node E, P and Q request to join LPG 1 (LPG 650) by broadcasting a signal to GH A 600. Nodes E, P and Q will receive the heartbeat message 510 from GH A 600 and respond by broadcasting join message 550 to GH A 600. GH A 600 will determine whether to allow nodes E, P and Q 605, 606, and 607 into the LPG by determining if the maximum allowed size for the LPG or maximum allowed hop count. If the maximum allowed size for the LPG or maximum allowed hop count, GH A 600 will allow the nodes to become GNs and increment a counter to update the number of nodes in the LPG. The new GNs will then broadcast its status message periodically to the GH 10.

FIG. 6B depicts the second example where neither group has a GH 10. In FIG. 6B LPG 1 650 consists of four nodes A, B, C, D 610-613, respectively. LPG 2 consists of the same three nodes, E, P, Q 605-607, as above. In this situation, the first node that broadcasts a heartbeat message 510 will become the GH 10 using, if necessary (i.e., two or more GHs 10), the header resolution rules as described above. Each node has a randomly set timer 256 that will expire if the node does not receive a heartbeat message 510, therefore, the new GH 10 will be the node that has its timer expire first.

The new GH 10 will then organize the new LPG. The new LPG ID number will be based upon the GH number. The new GH 10 will periodically broadcast its heartbeat message 510 and the other nodes will join the LPG via the new GH.

Specifically, the other nodes will broadcast a join message 550 to the new GH. The new GH will determine whether to allow nodes into the LPG by determining if the maximum allowed size for the LPG or maximum allowed hop count has been reached. If the maximum allowed size for the LPG or maximum allowed hop count has not been reached, the new GH will allow the nodes to become GNs 20 and increment a counter to update the number of nodes in the LPG. The new GNs will then broadcast its status message 560 periodically to the GH 10.

FIG. 6C depicts the third example of merging where both LPG have GHs 10 and nodes from different LPGs join together. In FIG. 6C LPG 1 650 has GH A 600 and LPG 2 660 has GH Q 640. LPG 1 650 has GNs B, C, and D, 601-603, respectively, and LPG 2 660 has GNs E and P, 606 and 607. Header resolution will be used to determine one GH 10 for the combined LPGs. GH A 600 and GH Q 640 will broadcast the header resolution message 520 and enter header resolution mode. The GH 10 for the new combined LPG will be determined based upon the header resolution rules described above, e.g., based upon a predetermined selection criterion. Once the new GH 10 is selected, the new GH 10 will then organize the new LPG. The new GH will then periodically broadcast its heartbeat message 510 and the other nodes will join the LPG via the new GH10.

The other nodes will broadcast a join message 530 to the new GH 10. The new GH will determine whether to allow nodes into the LPG by determining if the maximum allowed size for the LPG or maximum allowed hop count has been reached. If the maximum allowed size for the LPG or maximum allowed hop count has not been reached, the new GH will allow the nodes to become GNs 20 and increment a counter to update the number of nodes in the LPG. The new GNs 20 will then broadcast its status message 560 periodically to the GH 10. The new LPG ID number will be based upon the GH number.

When any node within an LPG becomes communicationally separated from the GH 10, e.g., out of range for radio transmission, splitting of the LPG occurs. In this case, the group with the GH 10 will continue as before. The node(s) that can no longer receive the heartbeat message 510 from the GH 10 will split from the LPG and either create their own LPG or join another LPG. When a node splits from the LPG, the GH 10 will, as described above, "age" the GN 20 from the group list, that is, store in the GH's memory section 200, since it will not receive a periodic update or status message 560 from the leaving node. The GH 10 will then remove the node from the LPG list after a preset time. This will help the GH keep an updated membership list as well as a current count on the number of nodes in the LPG so that new nodes will not be allowed membership into the LPG if the predetermined maximum size value has not been reached.

The nodes that split from the original LPG will need to select a new GH 10, if forming a new group. One of the nodes will become the new GH 10 when the timer 256 expires after no heartbeat message 510 is heard in the heartbeat interval (T), e.g., timer 256 will expire. The new GH 10 will, if necessary (i.e., two or more GHs 10), be selected using the header resolution rules. The new group would use the same LPG ID as the old group but with a new GH ID to provide uniqueness. Other nodes that split from the original LPG will join the new LPG through the new GH 10. The nodes will receive the heartbeat message 510 from the new GH 10 and broadcast a join message 550. The GH 10 will allow all of the nodes to join until the predetermined maximum size for the LPG is reached or until the maximum hop count has been reached. Alternatively, the node can make this determination.

On the other hand, the nodes that split from the original LPG, e.g., nodes E, P and G, F can join another LPG. These nodes will join via the other LPG's GH 10. The nodes will receive the heartbeat message 510 from the GH 10 and broadcast a join message 550 requesting to join the other LPG. The GH 10 will determine if the nodes can join the LPG based upon a predetermined threshold value.

When a node leaves the LPG, the other nodes must be informed of the change in status of the LPG. If a GN 20 leaves the group, the GN 20 can actively notify the GH 10 that the node is leaving. The GH 10 will then affirmatively remove the GN ID from its memory section 200. Alternatively, if a GN 20 leaves the LPG, the GH 10 will not receive the randomly broadcast status message 560 from the GN 20. The GH 10 will, as described above, then "age" the node and after a preset time, the GH 10 will remove the GN ID from its memory section.

If the leaving node is the GH 10, no heartbeat message 510 is broadcast and none of the GNs 20 will receive a heartbeat message 510. Therefore, a new GH 10 must be selected. The first GN 20 that broadcasts a new heartbeat message 510 will be deemed the new GH 10. The node that has its timer 256 expire will broadcast this heartbeat message 510. The new GH 10 will then send out the heartbeat message 510 and the last known group list that is stored in memory. The other nodes will continue to be GNs 20 in the LPG. They will now broadcasts the status message 560 to the new GH 10.

Figure 8:
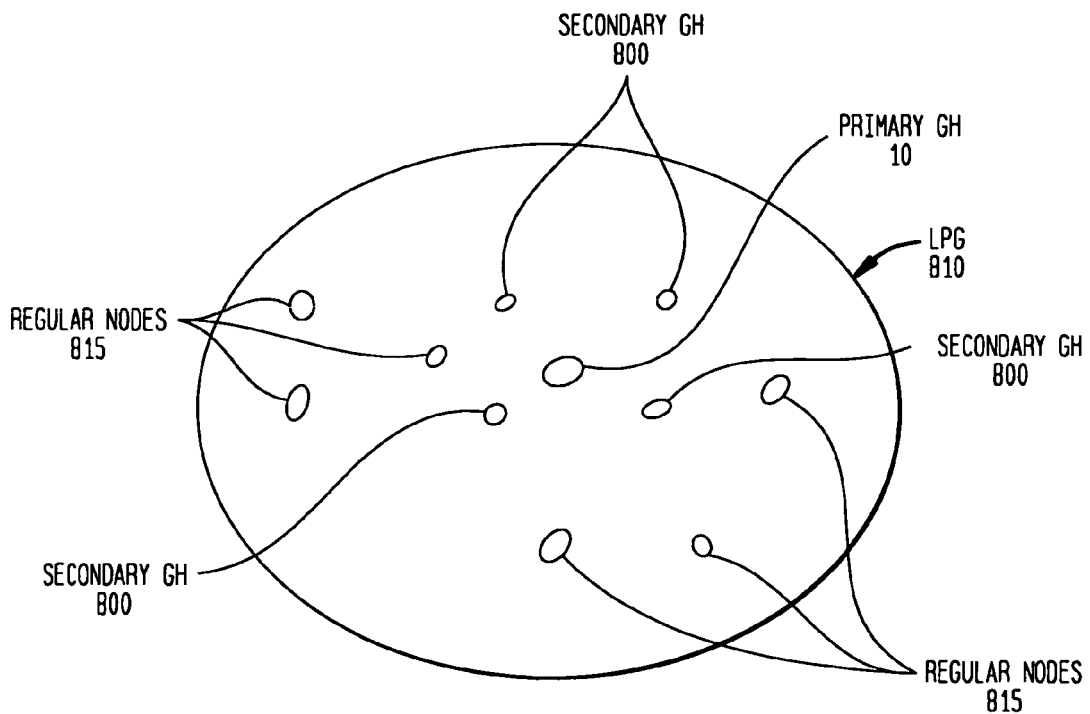
FIG. 8 illustrates an LPG according to the second embodiment of the invention.

FIG. 8 illustrates a second embodiment of the invention. According to the second embodiment, a plurality of secondary header nodes or core nodes 800 can be used to help coordinate and control the LPG 810. The plurality of secondary header nodes 800 is selected to act like GHs 10 and receive group list information. When the primary GH 10 is still present in the LPG 810, secondary GH node(s) 800 in the LPG 810 collects information to act as a hot standby to the primary GH 10, i.e., the secondary GH node(s) 800 collects information but otherwise does not act as a primary GH 10 node to manage the LPG 810. A Secondary GH nodes 800 are selected based upon the nodes' proximity to the primary GH such that when the primary GH 10 leaves the LPG 810, the new GH will have minimum impact on the structure of the LPG 810, i.e. nodes that were within the maximum hop count to the primary GH are still within the maximum hop count to the new GH 10. One way to promote LPG structure stability is to choose the secondary GH nodes 800 based on the number of hops from the primary GH 10.

When a primary GH 10 leaves the LPG 810, the one of the secondary header nodes 800 takes over as the GH. When the primary GH 10 node leaves the LPG 810, it may inform the core node(s) to take over as the new GH 10 node. If this is not possible to inform the secondary GH node(s) 800, the secondary GH node(s) 800 will discover that the primary GH 10 node has left by the expiration of the timer since no heartbeat message from the departed primary GH 10 node will be heard. The secondary GH node(s) 800 will then take over as the new GH 10 node. Since the secondary GH nodes 800 act like GHs and receive the group list information, the transition between GHs is almost instantaneous. If there are more than one secondary nodes 800 on hot standby, one of them will be selected. The selection may be based on a pre-established order of taking over as the GH 10 node, or the one that is closest (i.e., smallest number of hops) to the departing primary GH 10 node will take over as the new GH 10 node. The remaining nodes in LPG 810 are regular nodes 815.

Figure 9:
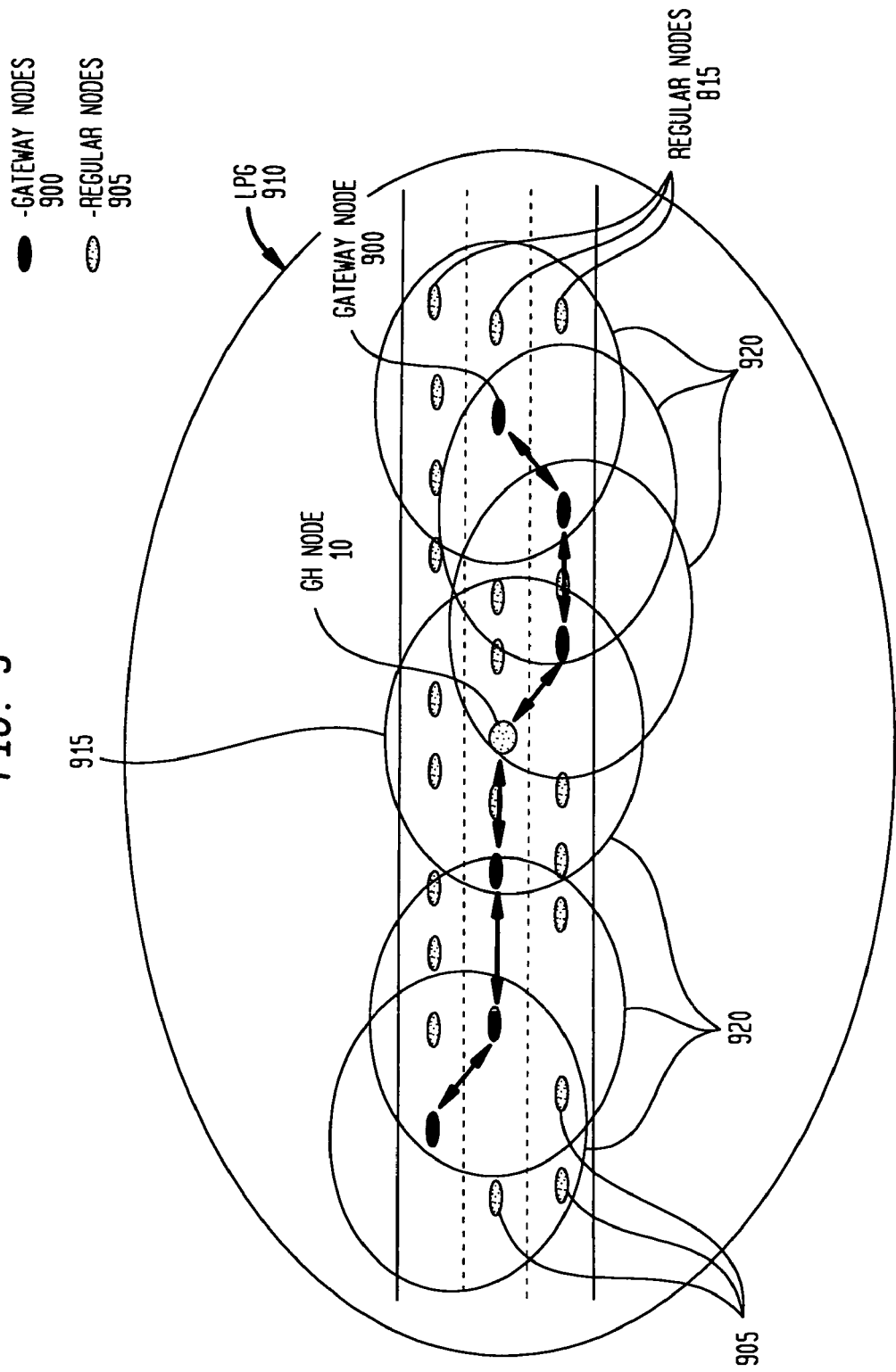
FIG. 9 illustrates an LPG according to the third embodiment of the invention.

FIG. 9 illustrates a third embodiment of the invention. In this embodiment, the LPG 910 is formed from a Group Header node (GH) 10, a plurality of gateway nodes 900 and regular nodes 905. The GH 10 is a special gateway node or a clusterhead. In this embodiment, only a GH 10 and the gateway nodes 900 can forward message. This reduces the flow of messages in the wireless channel from the GH only based organization, as described above. In the above-described embodiment, there is plurality of control messages that are sent out to exchange information between GH 10 and each node, also to maintain the structure of LPG 910. This might result in the wireless channel being occupied and jammed by these messages.

In this embodiment, a GH 10 is selected using the same header resolution as disclosed for the first embodiment and the LPG 910 will have one centralized GH 10 within the LPG 910. At this point, there will be no other nodes within the LPG and no other structure. The GH 10 will then broadcast a heartbeat message 510 to any node within radio transmission range (within the first hop distance to the GH). The nodes receiving a heartbeat message 510 will re-broadcast the heartbeat message 510 within their radio transmission range. The heartbeat message 510 will continue to be re-broadcast by nodes until the hop count limit is reached. Each node may receive multiple copies of the heartbeat message 510 from different neighboring nodes. For each node, the forwarding node of the first non-duplicate heartbeat message 510 becomes its gateway node 900 and the gateway node 900 is notified. All nodes which are not GH 10 or gateway nodes 900 become regular nodes 905.

Based upon a predefined selection criterion several nodes will be selected as a gateway node 900 for the LPG 910 and all other nodes become regular nodes 905. A regular node 905 can send a message; however, the regular nodes 905 cannot forward a message. The GH 10 and at least one gateway node 900 in LPG 910 handle the message delivery. Additionally, the heartbeat message 510 itself is used to maintain the LPG structure and therefore there is no need to generate other control message for LPG organizing purpose. Furthermore, even if some nodes moved to different locations, the heartbeat message 510 is used to create the new structure each time.

Specifically, the gateway nodes 900 are used to extend the radio range (extended ranged 920) of the GH 10 beyond the GH's initial maximum transmission range 915. Each regular node 905 can broadcast the status messages 560 to the gateway nodes 900, which will relay the status message 560 to the GH 10. The gateway nodes 900 will wait a predetermined period of time (P) and collect all status messages 560 that it receives. The status message(s) 560 will be store in memory. Once the predetermined period of time expires, the gateway node(s) 900 will broadcast one message containing an aggregate of the plurality of status messages 560 that the gateway node(s) 900 received during the predetermined period of time (P). This message can be relayed through other gateway nodes 900 to the GH 10.

One advantage of the group-header based LPG is that the size of LPG (i.e., the number of nodes within each LPG) can be controlled to limit the wireless bandwidth loading of each LPG so as to provide some lower bound on communication latency within each LPG. Another advantage of the group-header based LPG is the knowledge of GH node and GN nodes within each LPG and the number of hops away from the GH node can lead to efficient routing and multicasting protocols (for intra-LPG communication), since with such knowledge each node can more efficiently select next-hop node towards every other node (within the LPG) as the destination in building up its routing table. The use of core node(s) further adds stability of the group-header based LPG which is crucial for routing and multicasting communications. The use of gateway nodes can reduce the amount of control traffic (to maintain the LPG) thereby improving wireless bandwidth utilization and reducing communication latency.

Each moving wireless device or node will include a program installed in the memory means that allows the device to perform the functions set forth above.

This program or software package can be installed into the moving wireless device when manufactured. Alternatively, the program can be uploaded to the moving wireless device from a remote location after installation.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A method of establishing and maintaining an ad-hoc wireless network between a plurality of moving nodes, where said plurality of moving nodes are divided into a dynamically formed local peer group (LPG) without ordering said plurality of moving nodes, said method comprises the steps of:

selecting a group header node (GH) for said LPG from said plurality of moving nodes, said GH is assigned a unique group header identification, said GH controls and manages membership in said LPG;

broadcasting a plurality of control messages identifying said LPG and providing information regarding said LPG, including a heartbeat message signal from said selected GH, said heartbeat message is broadcast at a fixed interval;

determining if others of said plurality of moving nodes can join said LPG based upon a predetermined threshold value; and creating a network link between said others of said plurality of moving nodes if it is determined that said other of said plurality of moving nodes can join the LPG as group nodes (GNs);

wherein if there is more than one GHs within the LPG, said selection step further comprises the steps of:

broadcasting a header resolution message from each of said more than one GH;

performing header resolution to select only one GH as the GH for the LPG, based upon a predetermined selection criterion; and broadcasting a GH selected message by the new GH that was selected, and the others said more than one GHs join the LPG via the new GH.

2. The method of claim 1, wherein said predetermined selection criterion is based upon a first node of said more than one GH that broadcasts the heartbeat message.

3. The method of claim 1, wherein said heartbeat message includes a Local Peer Group Identification, GH identification number, a number of nodes within the LPG, a maximum number of nodes allowed in the LPG, a hop count, a maximum hop and a time of a next heartbeat message.

4. The method of claim 3, further comprising the steps of: receiving said heartbeat message by said others of said plurality of moving nodes within a radio range; and determining whether to broadcast a join Local Peer Group message to the GH, said determination is based upon a comparison of at least one parameter with said predetermined threshold value where said at least one parameter including the number of nodes within said LPG and said hop count and said predetermined threshold value is said maximum number of nodes allowed in the LPG and the maximum hop, said others of said plurality of moving nodes broadcast said join local peer group message if said at least one parameter does not exceed said predetermined threshold value and does not broadcast the join LPG message if the at least one parameter exceeds said predetermined threshold value.

5. The method of claim 1, wherein upon receipt of the heartbeat message said others of said plurality of moving nodes broadcast a join Local Peer Group signal to the GH, and the step of determining if said others of said plurality of moving nodes can join is performed by the GH, said determination is based upon a comparison of at least one parameter with said predetermined threshold value, said at least one parameter including a number of nodes within the LPG and a hop count and said predetermined threshold value is a maximum number of nodes and a maximum hops, said GH allows said other of said plurality of moving nodes to join said LPG as GNs if said at least one parameter does not exceed said predetermined threshold value and does not allow said other of said plurality of nodes to join said LPG if the at least one parameter exceeds the predetermined threshold value.

6. The method of claim 1, where said plurality of control messages further includes a group membership message that includes an identification of all GNs within the LPG, a Local peer group Identification, a GH identification and a timestamp, said identification of GNs within the LPG is periodically updated via a status message broadcast from said GNs.

7. The method of claim 6, wherein the identification of the GN is removed from said group membership message if said status message is not received from said GN after predetermined time interval or if an affirmative leaving message has been received by the GH from the GN.

8. The method of claim 6, wherein said group membership message is included in said heartbeat message and is broadcast at said fixed interval.

9. The method of claim 1, further comprising the steps of: receiving said heartbeat message from the GH at the GNs; randomly setting a timer to a value greater than the heartbeat period at each GN within the LPG and waiting for the next heartbeat message; and decreasing the timer when no heartbeat message is received, wherein if said timer expires prior to receiving said next heartbeat message, said GN having the first timer to expire broadcasts its own heartbeat message and acts as a new GH, where the first GN that broadcasts the heartbeat message becomes the new GH for the LPG.

10. The method of claim 1, further comprising the step of selecting at least one gateway node for said LPG, said at least one gateway node functions to relay a plurality of messages from said GNs to said GH.

11. The method of claim 10, wherein said at least one gateway node collects a plurality of status messages received from said GNs, stores said plurality of status messages in memory and after a predetermined period of time has elapsed, broadcasts one message, containing an aggregate of said plurality of status messages, to said GH.

12. The method of claim 1, further comprising the step of selecting at least one secondary GH, the at least one secondary GH not broadcasting the plurality of control message while said GH is within the LPG, wherein when said GH leaves the LPG, said at least one secondary GH becomes a new GH for the LPG.

13. An ad-hoc wireless network system comprising;
at least one local peer group (LPG), said LPG being dynamically formed from a plurality of moving wireless devices, said plurality of moving wireless are not ordered, said LPG includes:
one group header node (GH) which is selected from said plurality of moving wireless devices and is assigned a unique group header identification, said GH controls and manages membership in said LPG by broadcasting a plurality of control messages identifying said LPG and providing information regarding said LPG, including a heartbeat message at a fixed interval, and
at least one group node (GN) which is created from the remaining moving wireless devices of said plurality of moving wireless devices within radio range of said GH when a predetermined threshold value has not been reached by said at least one LPG,
said at least one GN can communicate with said GH via a network link created between said at least one GN and said GH, said at least one GN broadcasts a status message containing information about the GN to the GH;
wherein if there is more than one GH within the LPG, said more than one GH broadcasts a header resolution message to each other GH and enters into header resolution mode to select one GH as the GH for the LPG based upon a predetermined selection criterion and after one GH is selected, the one GH broadcasts a GH selected message to all other GNs within the LPG and then broadcasts the heartbeat message, the others of said more than one GHs join the LPG via the new GH.

14. The ad-hoc wireless network according to claim 13, further comprising:
at least one gateway node selected from said remaining moving wireless devices of said plurality of moving wireless devices, said at least one gateway node functions to relay a plurality of messages from said at least one GN to said GH, said plurality of messages includes a status message from said at least one GN to said GH, said at least one gateway node collects said status message received from said at least one GN, stores said status message and after a predetermined period of time has elapsed, broadcasts one aggregate status message containing an aggregate of all of said status messages received by said at least one gateway node during said predetermined period of time to said GH.

15. The ad-hoc wireless network according to claim 13, wherein the moving wireless device includes a memory section, a timer, a control means, a transmission and reception section and a heartbeat generating means, said heartbeat generating means generates the heartbeat message at the fixed interval, the heartbeat message includes LPG identification number, the GH identification, a number of nodes with the LPG, a maximum number of nodes allowed in the LPG, a hop count, a maximum hop and a time of the next heartbeat message, when said moving wireless devices is selected as the GH, said fixed interval is counted by said timer and when said timer expires, said heartbeat generating section broadcasts said heartbeat message based upon information stored in the memory section, said control section controls the GH including the determination of whether one of said remaining moving wireless devices of said plurality of moving devices can join said LPG by comparing the predetermined value with at least one parameter, if it is determined that said one of said remaining moving wireless devices of said plurality of moving devices can join the LPG, said control section instructs said transmission and reception section to broadcast a GN accept message, whereas if said control section determines that said one of said remaining of said plurality of moving devices cannot join the LPG, said control section instructs said transmission and reception section to broadcast a GN deny message.

16. The ad-hoc wireless network according to claim 13, wherein when the said remaining plurality of moving wireless devices is selected as a GN, the node includes a memory means, a timer, a control section, and a transmission and reception section said transmission and reception section broadcasts a status message, at a fixed interval to said GH, said fixed interval is by said timer, and when said timer expires, said transmission and reception section broadcasts the status message, based upon information stored in the memory means, said timer is also set to a random time period greater than the heartbeat period, upon reception of said heartbeat message by the transmission reception section, said timer is reset upon a reception of another heartbeat message, if no heartbeat message is received by the transmission/reception section before said timer expires, said control means instructs said transmission/reception section to broadcast its own heartbeat message including information relating to the LPG stored in the memory means and to act as new GH for said LPG.

17. The ad-hoc wireless network according to claim 13, wherein when said remaining plurality of moving wireless devices receiving said heartbeat message said remaining plurality moving wireless device determines whether to broadcast a join LPG message to the GH, said determination is based upon a comparison of at least one parameter with the predetermined threshold value, said remaining wireless devices plurality of moving wireless devices broadcasts the join LPG message if it is determined that said at least one parameter does not exceed said predetermined threshold value, and does not broadcast the join LPG message if the at least one parameter exceeds the predetermined threshold value.

18. The ad-hoc wireless network according to claim 13, wherein said plurality of wireless devices is at least one moving vehicle.

19. The ad-hoc wireless network according to claim 13, wherein said plurality of wireless devices is at least one wireless device coupled to or embedded in a moving vehicle.

20. An ad-hoc network for establishing and maintaining an ad-hoc wireless network between a plurality of moving nodes, where said plurality of moving nodes are divided into a dynamically formed local peer group (LPG) without ordering said plurality of moving nodes, the network comprising: a processor for executing computer-readable program code provided on computer-readable storage medium, the computer-readable program code having instructions which causes said processor to execute the following steps:
selecting a group header node (GH) for said LPG from said plurality of moving nodes, said GH is assigned a unique group header identification, said GH controls and manages membership in said LPG;

broadcasting a plurality of control messages identifying said LPG and providing information regarding said LPG, including a heartbeat message from said selected GH, said heartbeat message is broadcast at a fixed interval;

determining if others of said plurality of moving nodes can join said LPG based upon a predetermined threshold value; and creating a network link between said others of said plurality of moving nodes if it is determined that said other of said plurality of moving nodes can join the LPG as group nodes (GNs);

wherein if there is more than one GHs within the LPG, said selection step further comprises the steps of:

broadcasting a header resolution message from each of said more than one GH;

performing header resolution to select only one GH as the GH for the LPG, based upon a predetermined selection criterion; and broadcasting a GH selected message by the new GH that was selected, and the others said more than one GHs join the LPG via the new GH.

* * * * *